United States Patent [19]

Butler Jr.

[11] E Re. 29,365

[45] Reissued Aug. 23, 1977

[54] WEB SUPPLY APPARATUS

[75] Inventor: Richard A. Butler Jr., Chestnut Hill, Mass.

[73] Assignee: Butler Automatic, Inc., Canton, Mass.

[21] Appl. No.: 687,260

[22] Filed: May 17, 1976

Related U.S. Patent Documents

Reissue of:

[64] Patent No.: 3,858,819
Issued: Jan. 7, 1975
Appl. No.: 299,713
Filed: Oct. 24, 1972

[51] Int. Cl.[2] ..... B65H 19/14; B65H 19/20

[52] U.S. Cl. ..... 242/58.3; 156/504; 242/58.4

[58] Field of Search ..... 242/58, 58.1–58.6; 156/502, 504, 505, 506, 507, 510

[56] References Cited

U.S. PATENT DOCUMENTS

| | | | |
|---|---|---|---|
| 2,035,682 | 3/1936 | Wikle | 242/58.4 X |
| 2,766,811 | 10/1956 | Armelin et al. | 156/504 |
| 2,987,108 | 6/1961 | Kilmartin | 156/504 |
| 3,030,043 | 4/1962 | Pinkham | 242/58.3 |
| 3,252,671 | 5/1966 | Phillips et al. | 242/58.4 X |
| 3,565,731 | 2/1971 | Schmermund | 156/504 |
| 3,753,833 | 8/1973 | Bassett et al. | 242/58.6 X |

*Primary Examiner*—Stanley N. Gilreath
*Assistant Examiner*—John M. Jillions
*Attorney, Agent, or Firm*—Cesari and McKenna

[57] ABSTRACT

Web supply apparatus for supplying relatively stiff web material such as liner board for a corrugator serves the web from one of two supply rolls. The running web passes through a splicing station and a festoon on its way to the web-consuming machine. The leading end of the ready web is prepared on a web positioning bar away from the splicing station and then carried by the bar to the splicing station while the running web is being consumed. When the roll of running web expires, a control system automatically stops the roll of running web and special pressure pads at the splicing station press the running web and ready web together to make a strong splice between them. Immediately thereafter, a knive fires directly behind the splice, thereby cutting the trailing end of the running web. The pressure pads firmly grip the webs above and below the line of the cut so that the knife slices cleanly through the web. Following this, the roll of ready web is accelerated and the trailing end of the running web pulls the ready web into the festoon which then refills to complete the splicing cycle. When the apparatus incorporates roll stands of the rollout type, the web positioning bars are affixed directly to the roll stands and move in and out of the splicing station with them. When the roll stands are of the fixed type, the positioning bars are moved from a remote loading station to the splicing station by a special transport assembly. Also, the positioning bars can be moved manually from the preparation site to the splicing station if the situation demands it. Thus, the splicing is accomplished at zero speed with maximum reliability, yet the stiff web proceeds uninterruptedly and at constant speed to the corrugator.

22 Claims, 8 Drawing Figures

WEB SUPPLY APPARATUS

Matter enclosed in heavy brackets [ ] appears in the original patent but forms no part of this reissue specification; matter printed in italics indicates the additions made by reissue.

BACKGROUND OF THE INVENTION

This invention relates to web splicing apparatus. It relates more particularly to apparatus of this type which automatically splices and cuts relatively stiff web material such as liner board for making corrugated cardboard. It is designed particularly to splice the leading edge of a ready web of stiff material to the trailing edge of a running web while the web proceeds uninterruptedly and at substantially uniform speed and tension to a web-consuming machine, e.g., a corrugator, printer, etc.

Web supply apparatus which supplies web uninterruptedly to a web-consuming machine is, of course, not new. Examples of such machines are shown in U.S. Pat. Nos. 3,305,189 and 3,414,208. While these prior machines are able to handle relatively limp webs quite easily, making a strong, accurate splice with little or no tail, they are not so successful with the stiffer webs such as liner board. Sometimes the splice between the trailing end of the running web and the leading end of the ready web may not take or remain secure all across the web, with the result that the two webs sometimes come apart on the way to the web-consuming machine. Also, at times, the prior machines of this type do not cut cleanly all the way through the expiring end of the ready web, with the result that the splice has a very long tail which may be pulled into the web-consuming machine and interfere with its proper operation.

Another problem with the prior web supply apparatus is that it is difficult to incorporate them into an existing web processing setup because they are rather large and, therefore, cannot fit into the available space. In other words, the web supply and splicing apparatus is just one of a series of machines in a production line. All of the machines in the line are extremely large and massive and, therefore, extremely difficult and costly to move. Thus, many existing web processing setups cannot be retrofitted with conventional web supply apparatus having a splicing capability without having to move one or more of the massive machines in the line in order to accommodate the web supply apparatus.

SUMMARY OF THE INVENTION

The present invention aims to provide web supply apparatus which delivers even relatively stiff web such as liner board uninterruptedly and at a substantially constant speed to a consuming machine such as a corrugator.

Another object of the invention is to provide web supply apparatus which is able to splice even stiff webs in a reliable and consistent manner.

Still another object of the invention is to provide a web supply apparatus of the above type which can make a strong, neat splice at zero web speed, yet still deliver the web uninterruptedly to a web-consuming machine.

Still another object of the invention is to provide web supply apparatus of the above type which consistently cuts cleanly through the expiring end of the running web after the splice is made and leaves a small tail.

Still another object of the invention is to provide web supply apparatus of the above type which can be incorporated into many web processing lines without having to substantially rearrange other machines in that line.

Other objects will in part be obvious and will in part appear hereinafter.

The invention accordingly comprises the features of construction, combination of elements and arrangement of parts which will be exemplified in the construction hereinafter set forth, and the scope of the invention will be indicated in the claims.

In general, the present web supply apparatus delivers web such as liner board for making corrugated cardboard from one of two rolls, one of which is running and one of which is at the ready. The web from the running roll travels through a splicing station to be described in more detail later which is located more or less above and between the two rolls. From there, the web travels to a festoon or accumulator which is positioned in a generally horizontal plane directly above the two rolls and the splicing station and thence to the web-consuming machine. With the elements of the apparatus arranged thusly, the entire machine occupies a relatively small amount of space as compared with prior apparatus of this type. Consequently, it can be incorporated into an existing web processing line, for example, under the bridge of a corrugator, without requiring movement of the other heavy machinery in the line.

While web from the running roll is being consumed, the leading edge of the ready roll is prepared by securing it to a mounting bar by means of a suitable adhesive or the like and applying a strip of double-faced adhesive tape to the edge. Then the mounting bar is carried to the splicing station in a manner to be described in complete detail later to await depletion of the running roll.

When the running roll reaches a predetermined minimum diameter, the splicing cycle commences. First, the roll of running web is braked to a smooth stop. As soon as the roll stops, a pair of spaced-apart opposed pressure pads at the splicing station are projected toward each other. One pad extends directly behind the mounting bar holding the leading edge of the ready web. The other pad is located behind the running web passing through the splicing station. As the two pads are urged toward one another, the running web and ready web are pressed together and adhere by virtue of the double-faced, pressure-sensitive tape on the ready web.

A knife is associated with each pressure pad at the splicing station, each knife extending the full width of the web. The knife associated with the pad behind the running web is actuated automatically immediately following the splice so that it is propelled through the running web and into a special knife backup which allows the blade to sever the running web, but shields the ready web. The pressure pads are arranged so that, during the cutting operation, the pads securely grasp the ready and running webs both above and below the line of the cut. Since the running web is held firmly at both sides of the knife blade, it is under tension when the cut is made. Consequently, the blade cuts quickly and cleanly and surely through even stiff web material, such as liner board.

All during the splicing operation, the web supply apparatus still delivers web at constant speed and tension to the web-consuming machine, drawing on the supply of web stored in the festoon. As soon as the expiring end of the running web is severed as aforesaid, the roll of ready web is accelerated until the festoon is refilled with web from the new roll, thereby completing the splice cycle.

The present web supply apparatus thus achieves an excellent seal between the two webs. The joint is clean and uniform across the entire web even when splicing together webs of different widths or different grades. Furthermore, the splice overlap or "tail" is relatively small, on the order of 6 inches, so that there are no jams further downstream in the line and a printer can actually print right over the splice.

With the present apparatus, there is minimum waste because the system precisely controls the point of splice so that there is very little web left on the expiring roll. In addition, because there are no variations in the speed of the web fed to the web-consuming machine, the quality of the stiff web such as liner board is consistent, thereby minimizing its tendency to warp. This results in fewer problems during the downstream stacking and finishing operations.

The present web supply apparatus can be used with either the fixed position or rollout type roll stands for supporting the web rolls. The only major difference between the two embodiments involves the specific means for moving the web mounting bars to the splicing station as will be described later in greater detail.

BRIEF DESCRIPTION OF THE DRAWINGS

For a fuller understanding of the nature and objects of the invention, reference should be had to the following detailed description taken in connection with the accompanying drawings, in which.

DESCRIPTION OF THE PREFERRED EMBODIMENTS

Figure 1:
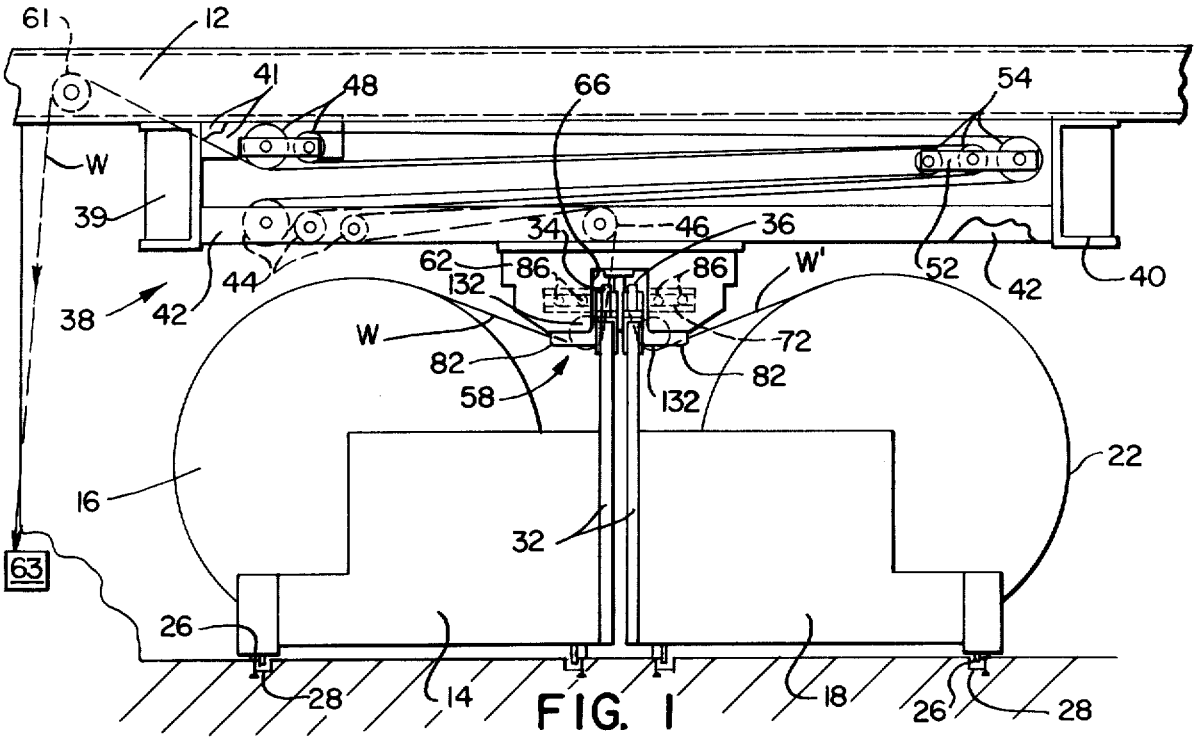
FIG. 1 is a front elevation of web supply apparatus made in accordance with this invention, and incorporating web stands of the rollout type.
Figure 2:
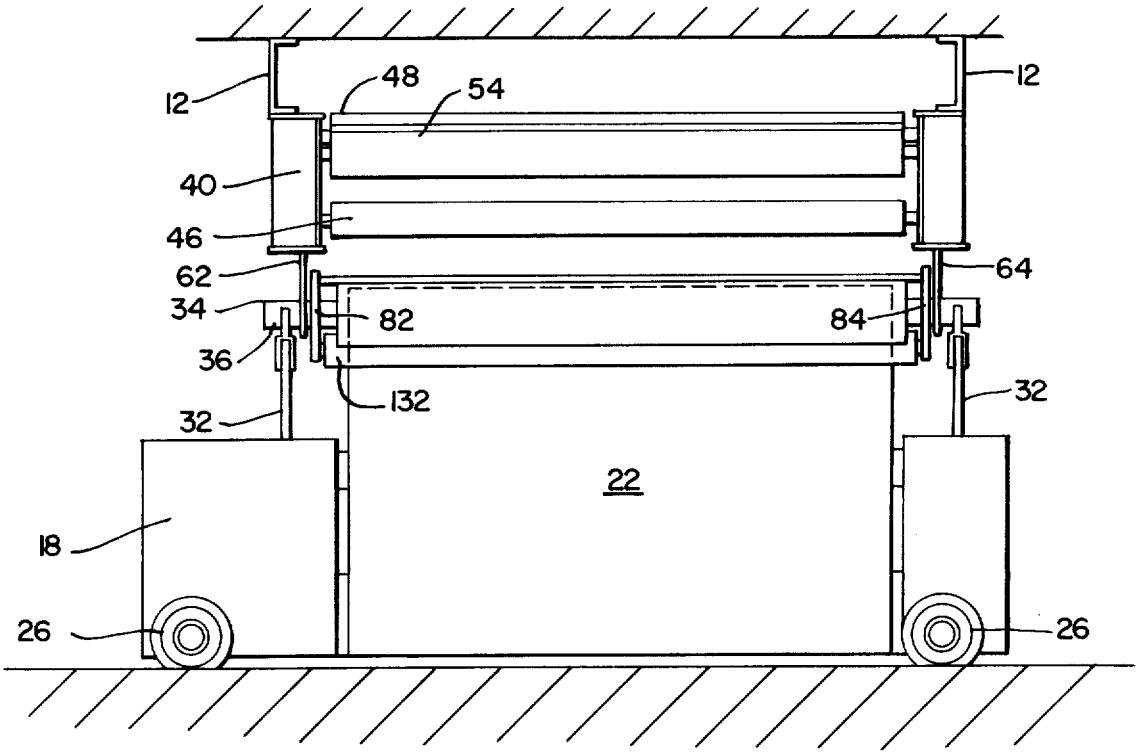
FIG. 2 is an end view thereof.

Refer now to FIGS. 1 and 2 of the drawings which show the apparatus of the present invention with roll stands of the rollout type. It is shown positioned under the bridge 12 of a conventional corrugator (not shown). One rollout stand indicated at 14 supports a roll 16 of running web W. The other stand 18 supports a roll 22 of ready web W'. Both roll stands 14 and 18 are fitted with wheels 26 which ride on tracks 28 in the floor. Basically, the purpose of the roll stands is to facilitate replenishing the web supply. When roll 16 expires, the web W is spliced to web W' and the apparatus draws on the web from roll 22. Roll stand 14 is rolled along tracks 28 away from the rest of the apparatus, i.e., out of the plane of the drawing figure. Then the core of the expired roll is removed from the roll stand 14 and replaced by a new roll of web. Following this, the roll stand 14 is rolled back into position as shown in the drawing figure to await depletion of the other web roll 22. Roll stands of this general type are well-known and will not be detailed here. They are shown, for example, in U.S. Pat. No. 3,488,014, French Pat. No. 7505004 and Belgian Pat. No. 763,032.

Figure 4:
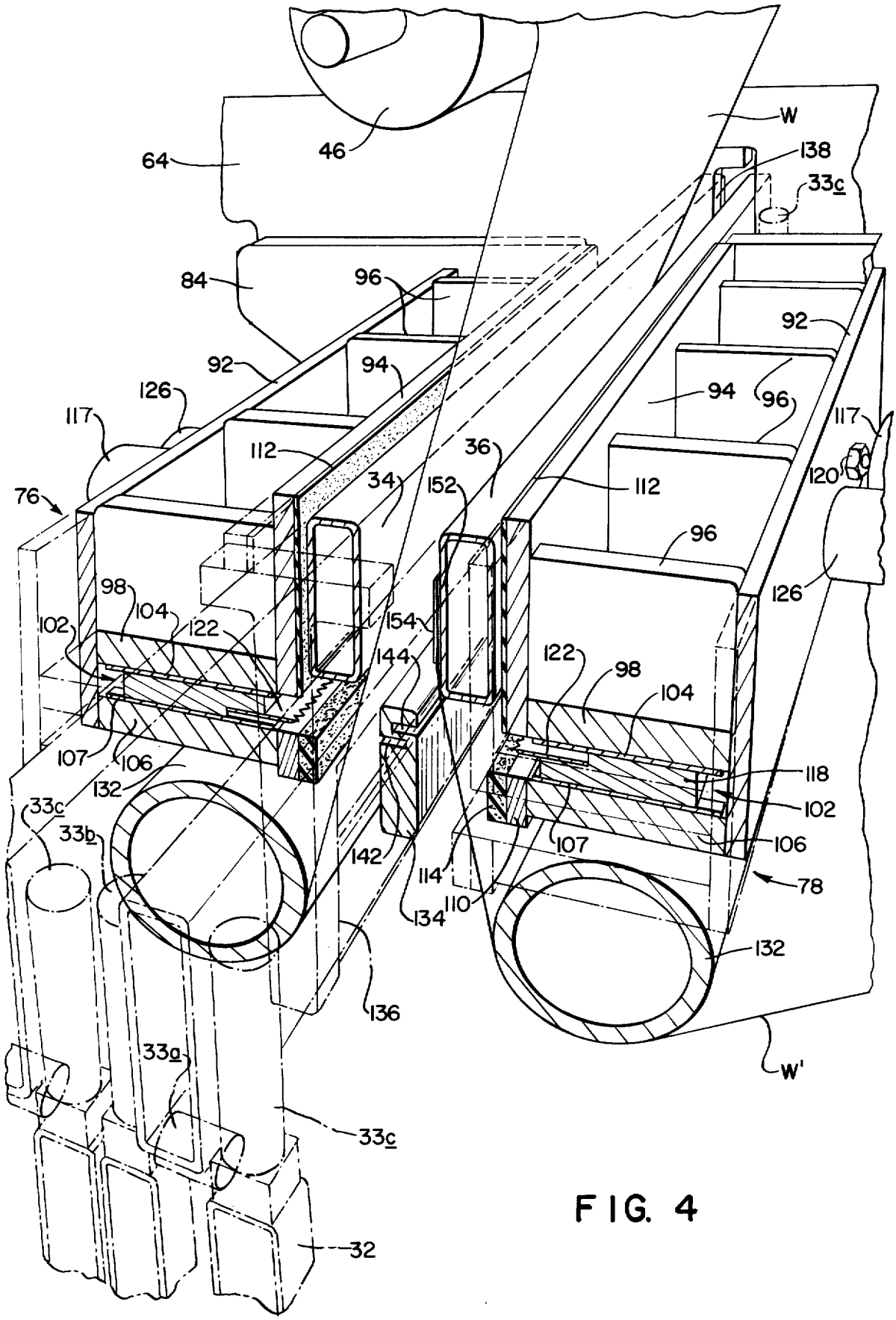
FIG. 4 is a perspective view with parts broken away on a still larger scale of the splicing station.

The present stands differ from the prior ones in that they include a pair of upstanding, spaced-apart columns 32 at the ends of the opposing sides of the stands. Three rollers 33a, 33b and 33c are mounted at the upper end of each column (FIG. 4). Roller 33a is generally horizontal, while rollers 33b and 33c are situated at the opposite ends of roller 33a and oriented perpendicular to that roller. The two columns on each stand are arranged to loosely horizontally support a long, rectangular web positioning bar; to wit; stand 14 supports a bar 34 and stand 18 supports a bar 36 for reasons to be dwelt on later. The rollers 33 permit lengthwise and lateral movement of each bar relative to its supports.

Directly above the roll stands and suspended from bridge 12 is a web accumulator or festoon indicated generally at 38. Festoon 38 includes a pair of transverse, spaced-apart end beams 39 and 40 which, in turn, support a pair of spaced-apart upper rails 41 and a pair of spaced-apart lower rails 42.

A selected number, i.e., three, of idler rolls 44 are rotatively mounted between rails 42 near the left-hand end thereof. Also, a guide roll 46 is rotatively supported from those rails midway across the festoon. Additional idler rolls 48 are rotatively mounted between rails 41. In the present instance, there are two such rolls located above rolls 44.

Festoon 38 also includes a yoke 52 which carries three dancer rolls 54 arranged generally in a horizontal plane. Yoke 52 is movable toward and away from the idler rolls 44 and 48 along a suitable track (not shown).

Web from the running roll, i.e., roll 16, is fed to the festoon 38 by way of splicing station indicated generally at 58, to be described in greater detail later. The web W is trained around the guide roll 46 and then looped back and forth between the fixed rolls 44 and 48 and the movable dancer rolls 54, thereby forming a number of bights in the festoon. Upon leaving the festoon, the web W is trained around a guide roll 61 rotatively supported by bridge 12 and thence passes on into the web-consuming machine, i.e., a corrugator 63.

During normal operation, the yoke 52 is biased away from the fixed rolls 44 and 48 pneumatically, hydraulically or by means of suitable counterweights so that it tends to assume a position near the right-hand side of the festoon. Accordingly, the festoon is able to store a relatively large supply of web, typically on the order of 60 feet or more. At some time while the running web is being consumed, the roll stand 18 is rolled out and filled with roll 22. The leading edge of web W' is adhered to the positioning bar 36 on stand 18 and prepared with double-face, pressure-sensitive tape. Then the stand 18 is rolled back into the position shown in FIG. 1 to await depletion of roll 16. In this position, the bar 36 and the leading edge of the ready web W' are situated in the splicing station 58.

As soon as the diameter of the roll 16 of running web reaches a predetermined minimum size, the apparatus automatically commences its splice cycle, whereupon roll 16 is immediately braked to a stop by conventional braking means such as shown in U.S. Pat. Nos. 3,305,189 and 3,414,208.

As soon as the running web roll 16 stops, the leading edge of the ready web W' which has been prepared as aforesaid is bonded to the running web in the splicing station 58 as will be described later in detail and the running web W is severed just behind the splice. Following this, the roll 22 of ready web is accelerated.

When the web entering the festoon 38 slows and stops as the splice is being made, the yoke 52 and dancer rolls 54 move toward the idler rolls 44 and 48 as the web-consuming machine uses up the accumulation of web in the festoon. Then as the ready roll 22 accelerates after the splicing operation, the festoon 38 receives more web than it loses so that the yoke 52 resumes its normal position near the right-hand end of the festoon, thereby completing the splice cycle.

With the apparatus now consuming the web W' from roll 22, the stand 14 can be rolled out and the core thereon replaced by a new roll of web. In this case, the leading edge of that web is adhered to the web positioning bar 34 on stand 14 and prepared with double-faced adhesive. Then the roll stand 14 is moved back into its position shown in FIG. 1 to await the expiry of roll 22 and the next splice cycle.

The controls for detecting roll size to actuate the splice cycle, for initiating the splice at the proper time, for braking and accelerating the web rolls, and for controlling web speed and tension generally are all disclosed in U.S. Pat. No. 3,822,838 entitled ELECTRONIC UNWIND CONTROL, which application is owned by the assignee of the present application. Conventional web tension control mechanisms which also can be used to control the above aspects of the present system are shown in U.S. Pat. Nos. 3,305,189 and 3,414,208, also owned by said assignee.

Figure 3:
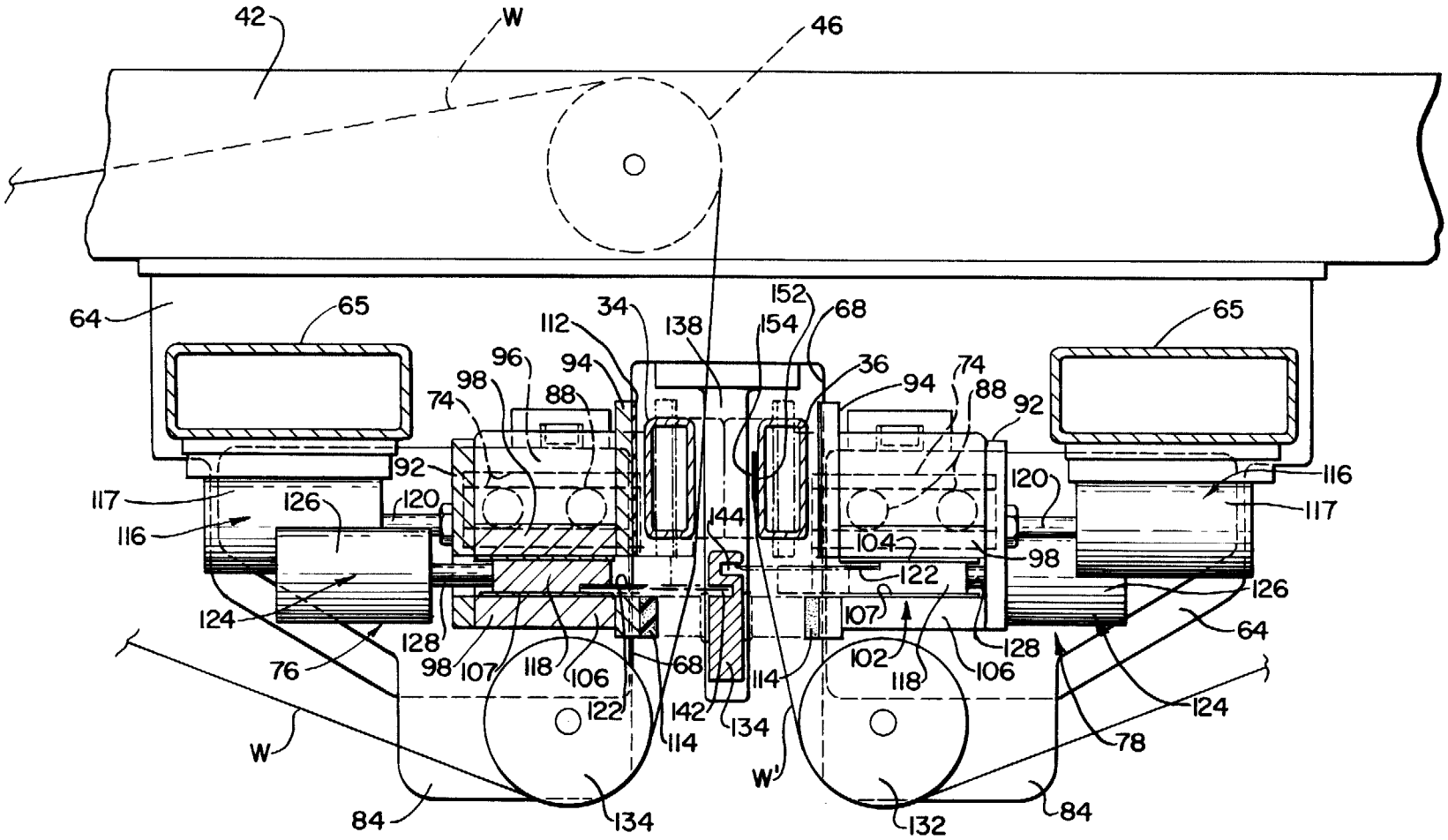
FIG. 3 is a sectional view on a larger scale showing splicing station of FIG. 1 apparatus in greater detail.

Turning now to FIGS. 1, 3 and 4, the splicing station 58 is comprised of a pair of front and rear depending plates 62 and 64 suspended from festoon rail 42 and connected by cross beams 65. Each plate 62, 64 is notched at 66 and 68, respectively, to provide clearance space through the centers of the plates. A pair of geneally horizontal channels 72 (FIG. 1) and 74 (FIG. 3) are formed on the front and rear plates, respectively, so that they oppose one another inside the splicing station. These channels form tracks for a pair of carriage assemblies indicated generally at 76 and 78.

Carriage assemblies 76 and 78 are substantially mirror images of one another. Therefore, we will use the same identifying numerals for their common components. Each carriage assembly includes a depending front plate 82 (FIG. 1) and a depending rear plate 84 (FIG. 3) arranged just inside end plates 62 and 64, respectively. A pair of rollers 86 on the outside of each plate 82 is arranged to ride in channel 72 and a similar pair of rollers 88 on the outside of each rear plate 84 are arranged to ride in the channel 74 on the rear end plate 64. This enables the carriage assemblies to move laterally in a generally horizontal plane toward and away from one another.

Connected between the front and rear plates of each carriage assembly is a long, rectangular bar 92. This bar 92 is spaced an appreciable distance back from the notches 66 and 68 in the end plates. Spaced in front and parallel to each bar 92 is a second bar 94 which is somewhat shorter vertically than bar 92. Each bar 94 is positioned so that its opposing face is more or less adjacent the edges of notches 66 and 68. Bars 92 and 94 are connected along their lengths by a number of spaced-apart lateral plates 96 which extend down to the lower edge of front plate 94. Further, a long, rectangular, generally horizontal plate 98 is positioned directly below plates 96 and secured to the front and rear plates 94 and 92 to provide an upper guide surface for a knife assembly indicated generally at 102. The lower face of plate 98 is provided with a wear surface 104. The lower guide for the knife assembly 102 is provided by a similar rectangular plate 106 spaced below and parallel to plate 98. Plate 106 has an upper wear surface 107 and is also secured to the rear plate 92 as well as to depending carriage plates 82 and 84.

The opposing edges of each lower knife guide 106 are provided with a coextensive rectangular facing plate 110 of the same thickness as plate 94. A pressure pad 112 made of rubber or other suitable resilient material covers the entire exposed face of the plate 94. A similar pad 114, somewhat thicker than pad 112, covers the exposed face of each plate 110.

Each carriage assembly 76 and 78 is movable along its track by suitable means illustrated here as a hydraulic piston shown generally at 116. Each piston 116 includes a cyliner 117 secured to the stationary beams 65 and a piston rod 120 whose free end is connected to the carriage rear plate 92. Each piston 116 is of the double-acting variety so that it can move its associated carriage assembly between a first position wherein the pressure pads 112 and 114 are located substantially adjacent the edges of the notches 66 and 68 to a second position where the pads protrude appreciably into the notches.

Still referring to FIGS. 3 and 4, each knife assembly 102 is comprised of a long, rectangular block 118 which is able to slide laterally in the space between the wear surfaces 104 and 107 relative to its supportive carriage assembly. A long knife blade 122 is secured to the inner edge margin of the block. The arrangement is such that when the block and knife blade are fully retracted, the edge of the knife blade does not protrude beyond the pressure pads 112 and 114. On the other hand, when the knife is extended, its cutting edge extends out appreciably beyond those pads.

A knife arrangement employing a special serrated knife and knife backup which is particularly suitable for cutting stiff web such as liner board is disclosed in U.S. application Ser. No. 273,717, filed July 21, 1972, entitled WEB CUTTING KNIFE now abandoned, said application being owned by the assignee of the present application.

The knife block 118 and blade 122 are moved between their two operative positions by means of a double-acting piston indicated generally at 124 (FIG. 3). Each piston includes a cylinder 126 connected to rear plate 92 and a piston rod 128 extending through an opening in that rear plate and connected to the rear of the knife block 118.

A guide roll 132 is mounted horizontally between the depending carriage plates 82 and 84. Each guide roll 132 is positioned at the lower inside corners of the end plates so that it can guide web from the adjacent supply rolls 16 and 22 into the splicing station 58 as best seen in FIG. 1.

Still referring to FIGS. 3 and 4, a special knife backup 134 is centered in the notches 66 and 68. The backup is essentially a long, rectangular rail which is oriented edge-up and suspended horizontally from the front and rear end plates 62 and 64 by a pair of straps 136 and 138. The backup 134 is formed with a pair of long, generally rectangular slots 142 and 144, each being directly opposite the adjacent knife blade 122. Each slot 142 and 144 is just wide enough and deep enough to accommodate the knife blade in its fully extended position.

Assume now that the web W is being consumed from the running roll 16 as shown in FIG. 3. At this point in time, the carriages 76 and 78 are in their fully retracted positions shown in solid lines in FIG. 3 and the knife assemblies 102 are also in their fully retracted positions. Assume, too, that both of the roll stands 14 and 18 are in their positions shown in FIG. 1. Thus, the running web W passes up adjacent the knife backup 134 and between the web positioning bars 34 and 36 to the guide roll 46. At the same point in time, the leading end of the ready web W′ is tacked to the inside face of positioning bar 36 by means of small strips 152 of double-faced, pressure-sensitive tape, Also, a relatively wide (i.e., 2 inch), long strip 154 of similar tape is adhered to the exposed leading edge margin of the ready web W′.

When the running roll 16 is about to expire, the splice cycle is commenced as described above. As soon as the roll 16 comes to a stop, the splicer's control system actuates the carriage assembly pistons 116 causing the carriage assemblies 76 and 78 to come together as shown in dotted lines in FIG. 3, so that their pressure pads 112 engage and press the positioning bars 34 and 36 together between straps 136 and 138. This, in turn, forces the web W against the adhesive strip 154 affixed to the leading edge of the ready web W′, with the pressure on the two webs being sufficient to make a strong, reliable bond between them. Immediately following this, the knife piston 124 in the left-hand carriage assembly 76 is actuated by the control system, causing the left-hand knife blade 122 to project out momentarily beyond its corresponding pressure pads 112, 114 through the web W and into the slot 142 in the knife backup 134.

It is important to note that when this cutting action takes place, the webs W and W′ are grasped firmly between the two positioning bars 34 and 36 above the knife. They are also held firmly below the knife between the lower pressure pads 114 and the knife backup 134. As noted above, these lower pads are somewhat thicker than the upper pads 112 to compensate for the widths of the positioning bars 34 and 36 adjacent the pads 112. Since the webs are held firmly on both sides of the line of cut, the knife blade is able to cut surely and cleanly through the web W quite close to the joint. Consequently, the splice is characterized by a relatively short tail, on the order of 6 inches, including the 2 inch joint. In this connection, it should be mentioned that the tail produced by the left-hand assembly 76 is slightly longer than the one produced by the right-hand assembly 78 because the two knife blades 122 and their receiving slots 142 and 144 are slightly offset one above the other. This offset arrangement and the special knife backup 134 allow the appropriate knife blade 122 to sever only the expiring end of the running web; the backup completely shields the ready web from the knife impact.

As soon as the web W is cut as aforesaid, carriage assemblies 76 and 78 retract automatically to their solid line positions shown in FIG. 3 and the leading edge of the ready web W′ is pulled by the running web W to which it is attached out of the splicing station 58 and over the guide roll 46.

As soon as the festoon is refilled and the splice cycle is completed, the roll stand 14 can be rolled out as described above, thereby withdrawing the positioning bar 34 from the splicing station 58 so that the leading edge of a new web roll can be positioned in stand 14 and prepared on bar 34 far away from the heat and congestion at the splicing station.

Figure 5:
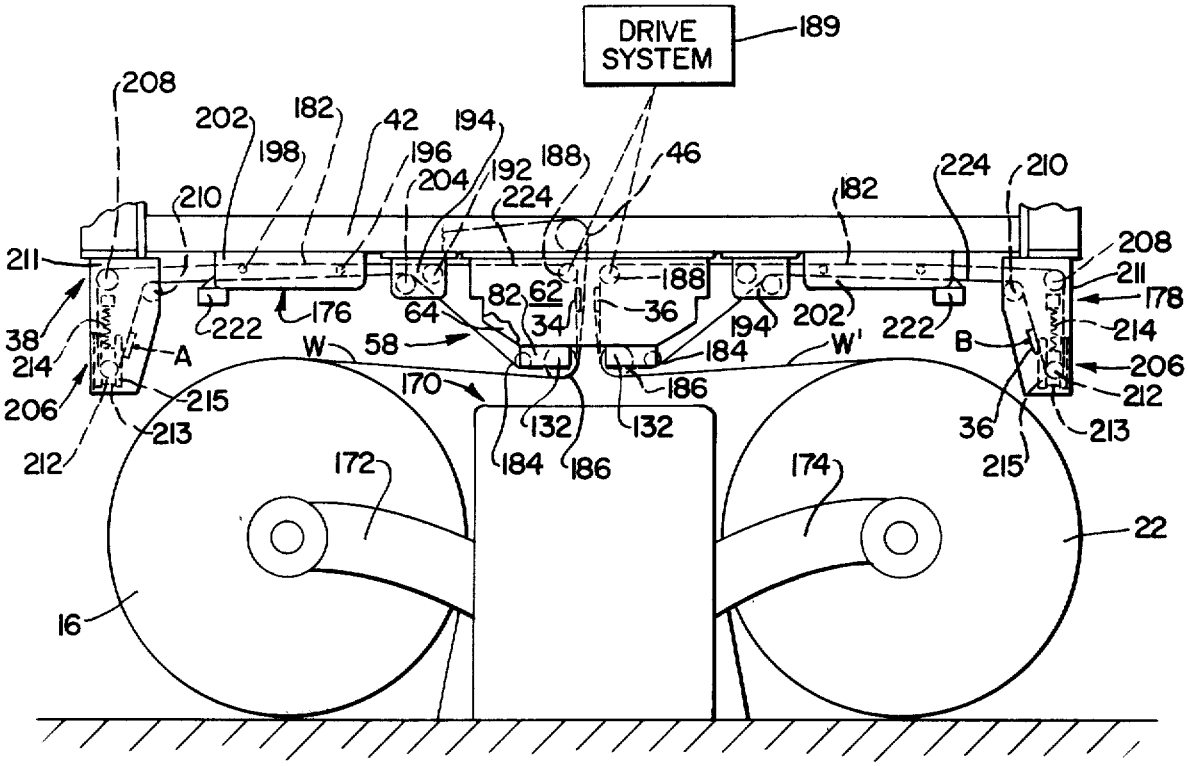
FIG. 5 is a view similar to FIG. 1 of an embodiment of the apparatus incorporating fixed position type roll stands.
Figure 6:
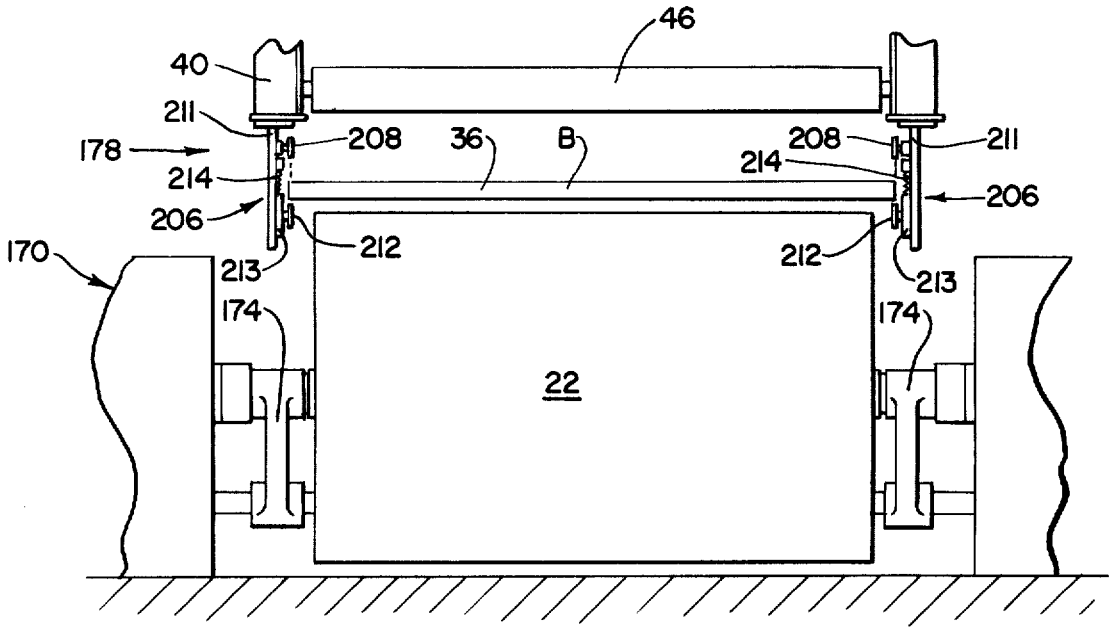
FIG. 6 is an end view thereof.

Turn now to FIGS. 5 and 6 of the drawings which show a slightly different splicer embodiment incorporating fixed type roll stands. Since most of the components of the FIGS. 1 to 4 embodiment of the invention are found also in this embodiment, we will assign the same identifying numerals to them. Aside from the roll stands themselves, the only other major difference here involves the means for carrying the positioning bars 34 and 36 from the location where the leading end of the ready web is affixed to them to their position at the splicing station 58.

A conventional fixed type roll stand indicated generally at 170 is positioned directly below the festoon 38 and splicing station 58. The roll stand 170 has a pair of spaced-apart chuck supporting arms 172 for holding the running web roll 16. The arms 172 can be lowered when loading a new roll onto the arms 172, after which the arms can be raised to lift the roll off the floor. A second similar pair of arms 174 are positioned at the opposite side of the roll stand supporting the ready web roll 22.

In this embodiment of the invention, each positioning bar carrying the leading end of the ready web is moved from a web loading position away from the splicing station 58 to the splicing station by positioning bar transport assembly. The transport assembly associated with the roll 16 is indicated generally at 176, the transport assembly associated with roll 22 is shown generally at 178. The two transport assemblies are substantially mirror images of one another. Accordingly, the same components of each assembly will be denoted by the same identifying numeral.

Each web positioning bar 34, 36 is supported at its opposite ends by a pair of endless chains 182. FIG. 5 shows the chain and its supporting mechanism which is situated at the front of the apparatus. An identical chain 182 and supporting mechanism is located at the rear of the apparatus, both chains moving in unison. The lower reach of each chain 182 in assembly 176 is trained around a pair of idler sprockets 184 and 186 rotatively mounted at the bottoms of depending carriage assembly plates 82 and 84. Each chain 182 extends up through the splicing station 58 and is trained over a sprocket 188 mounted near the top of plate 62 or 64. The sprockets 188 are driven by means of a suitable electric motor drive system 189.

The upper and lower reaches of each chain extend out generally horizontally away from the splicing station 58. The upper reach of each chain in assembly 176 passes over an idler sprocket 192 mounted on a depending plate 194 secured to the festoon rail 42. From there, the upper reach passes over a pair of guides 196 and 198 secured on a plate 202 also suspended from rail 42. The lower reach of each chain 182, on the other hand, passes over an idler sprocket 204 affixed to plate 194 and both reaches join at a chain tensioning assembly shown generally at 206, there being one at the front of assembly 176 and one at the rear thereof.

Each tensioning assembly 206 is comprised essentially of a pair of idler sprockets 208, 210 mounted on a fixed base 211 and supporting the upper and lower reaches of the chain, respectively. The chain loop beyond these sprockets passes around a third idler sprocket 212 on a fixture 213 which is slidable on a rail 215 toward and away from the fixed sprockets. A compression spring 214 acting between the fixed base supporting the sprockets 208 and 210 and the movable fixture 213 biases sprocket 214 downward so as to keep the endless chain 182 in a taut condition. The travel of the movable sprocket 214 also allows the path of the chain 182 to be altered for reasons to be discussed presently.

The two endless chains 182 in transport assembly 176 are moved in unison by the driven sprockets 188. By actuating the drive system 189 at the appropriate time either manually or automatically, the chains 182 are moved counterclockwise to advance the positioning bar 34 from a loading position shown at point A in FIG. 5 wherein the bar is shown in dotted lines to a ready position at the splicing station 58 wherein the bar is shown in solid lines.

The web positioning bar 36 associated with the right-hand roll in FIG. 5 is moved in exactly the same way by the chains in assembly 178. The chains are moved clockwise to advance the bar from a loading position at point B wherein the bar 36 is shown in solid lines to a ready position at splicer station 58 wherein the bar is shown in dotted lines. In actual practice, the driven sprockets 188 in each transport assembly 176, 178 are driven in opposite directions in unison by the same drive system 189. However, the two assemblies are 180° out-of-phase so that when the positioning bar 34 is in its ready position at the splicing station 58, the positioning bar 36 is in its loading position at point B, and vice-versa. A switch 222 is mounted on a bracket 202 in transport assembly 178. This switch is arranged to be tripped by a finger 224 projecting out laterally from the chain 182 when the web positioning bar 36 reaches its loading position at point B. Of course, this also means that the positioning bar 34 is in its ready position at the splicing station 58. A similar switch 222 and actuator 224 is associated with the transport assembly 176 to stop the bar 34 at its loading position at point A. Thus, each of the switches 222 turns off the drive system 189 at just the right times to properly locate the positioning bars 34 and 36.

Still referring to FIGS. 5 and 6, assume that the roll 16 is active and that the running web W is proceeding through the splicing station 58 and over the guide roll 46 and that a new roll has just been loaded onto the roll stand arms 174. At this point, the positioning bar 34 is located at splicing station 58, while the positioning bar 36 is located at its ready position at point B at the extreme right-hand side of the apparatus. The operator now takes the leading end of the fresh roll and attaches it to the positioning bar 36 as described above. He then places the strip 154 of double-faced tape over the exposed face of the leading edge margin. Next, he energizes the drive system 189 manually, or this may be done automatically at the proper time with relation to the completion of the previous splicing cycle. When the sprockets 188 are driven, the chains 182 carrying positioning bar 36 carry the leading edge of the ready web W′ along the paths of the chains around the guide roll 132 and to the ready position at splicing station 58. At the same time, the empty positioning bar 34 is carried counterclockwise by the transport assembly 176 to its loading position at point A at the extreme left-hand side of the apparatus. The two bars stop at the proper places because the switch 222 in the transport assembly 176 is tripped at the right time and turns off the drive system 189.

As soon as the roll 16 is depleted, the splicing cycle commences automatically as described above, the carriage assemblies 76 and 78 moving toward each other as described above. Since these assemblies carry the chains 182, the movable sprockets 212 in the tensioning assemblies 206 move up accordingly. In this embodiment, there is only one positioning bar at the splicing station 58 at any given time, e.g., bar 36. Accordingly, the pressure pad 112 on carriage assembly 76 presses directly against the running web W, while the pressure pad 112 on assembly 78 pushes the positioning bar 36 carrying the ready web against the running web so that a firm seal is formed between the two webs. As before, the knife blade 122 on carriage 76 is actuated to sever the ready web W just behind the splice, following which the carriage assemblies are retracted and the web W′ accelerated up to speed.

It should be mentioned also that since there is only one positioning bar at station 58, the pressure pads 112 on the carriage assemblies are made somewhat thicker than those depicted in FIGS. 3 and 4. Actually, they can be about the same thickness as the pressure pads 114 shown in those figures.

On completion of the splice cycle, the core of the expired roll is removed from the stand arms 172 and a fresh roll installed. The leading end of that roll is then affixed to the positioning bar 34 which is now located at the left-hand loading station at point A, to await depletion of the roll 22. Thus, the loading of the web and preparation of its leading end can be done at a location considerably away from the heat and confinement associated with the splicing station. Therefore, the web can be prepared more carefully and better splices obtained.

Figures 7, 8:
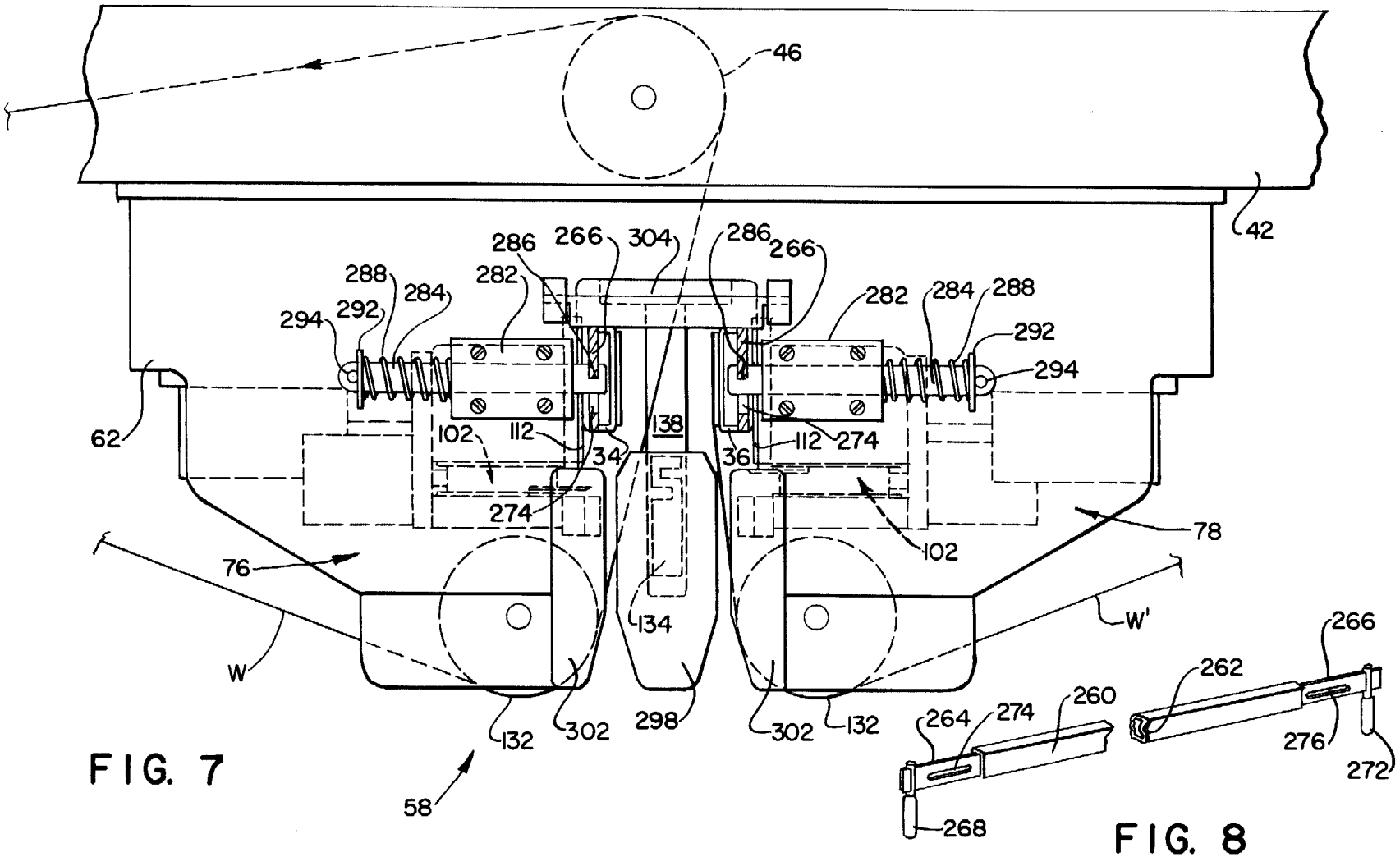
FIG. 7 is a front elevational view with parts cut away on a larger scale showing the splicing station of the apparatus adapted for manual handling of the web positioning bars.
FIG. 8 is a perspective view with parts broken away showing the web positioning bar used with the FIG. 7 apparatus.

FIG. 7 illustrates still another embodiment of the apparatus which can be used in conjunction with most types of roll stands. In this embodiment, the positioning bar carrying the leading edge of the ready web is moved manually to the splicing station 58. A typical positioning bar is illustrated in FIG. 8. It is comprised of a hollow, generally rectangular box frame 260. The front face of the box frame is faced with a resilient pad 262 of rubber or the like. Attached to the opposite ends of the frame are a pair of relatively long, generally rectangular straps 264 and 266 which project out from the ends of the frame. These straps are made of a berylium copper alloy which is quite strong yet quite flexible so that they will allow the bars to be pressed together to make a splice. A pair of elongated slots 274 and 276 are formed in the straps to support the bar at splicing station 58 as will be described presently and a pair of handles 268 and 272 are affixed to the free ends of the straps so that it can be carried easily. This same type of bar without the handles can be used with the FIGS. 1–4 embodiment of the apparatus.

Splicing station 58 is more or less the same as the one depicted in connection with the FIGS. 1–4 embodiment of the invention, except that provision is made for supporting the positioning bars which are carried manually to the splicing station 58. More particularly, a pair of identical, horizontally oriented slides 282 are mounted on the outside of front end plate 62 at the opposite edges of notch 66. Each slide slidably supports a strap or retainer 284. The end of the strap 284 facing the notch has a cutout or notch 286 extending down from its top edge. Each strap is arranged to project through the slot 274 in the web positioning bar shown in FIG. 8 with the top edge of the slot seating in the notch 286. Each strap 284 is biased away from notch 266 by a compression spring 288 acting between the slide 282 and a washer 292 mounted on the end of the strap and retained there by a pin 294 extending through the end of the strap. The straps 284 affixed to plate 62 are designed to support one end of a pair of positioning bars 34 and 36 and an identical arrangement affixed to the outside of the rear end plate 64 supports the other ends of these bars in exactly the same way.

FIG. 7 shows one positioning bar 34 supported by straps 284 at the left-hand side of the splicing station 58. The running web W which was originally carried by this bar passes up through the station and over roll 46. The leading end of the ready web W' has already been affixed to the other positioning bar 36 and that bar has been carried by two men standing in front of and behind the apparatus to the splicing station 58.

To facilitate mounting the bar, a pair of guide plates 298 are affixed to end plates 62 and 64 opposite the ends of the knife backup 134. Additional guide plates 302 are attached to plates 62 and 64 adjacent the edges of the notches 66 and 68. The web positioning bar 36 is slid up into the space between the guide plates 298 and 302 and the bar is hooked up onto the notched straps 284 to position the bar so that the leading end of the ready web is in position for the next splice. A top horizontal guide plate 304 is attached to plates 62 and 64 at the tops of each notch 66 and 68 to provide a guide for the positioning bars so that they cannot cock.

When the running web W is depleted, the web W stops and the carriage assemblies 76 and 78 are moved toward each other as described above. This pushes the positioning bars 34 and 36 together, this movement being accommodated by the slidable straps 284 to which the bars are connected. As soon as the bars press together, the running web is adhered to the ready web W', whereupon the running web is cut just behind the splice. Following this, the carriage assemblies retract, as do the positioning bars, due to the return bias afforded by the compression springs 288. The ready web W' is now pulled out of the splicing station 58 by the trailing end of the running web. Finally, the ready web roll is accelerated up to speed, completing the splicing cycle.

At any time after this, the positioning bar 34 can be removed manually from the splicing station 58 and outfitted with the leading end of a new ready web and returned to its position at station 58 to await the next splice. Except for the handling of the positioning bars then, the FIG. 7 apparatus is more or less the same as the other two embodiments. Therefore, it affords the same advantages in terms of the speed and reliability of the splice. Further, this embodiment is especially suitable when retrofitting existing apparatus where working space is at a minimum.

It will thus be seen that the objects set forth above, among those made apparent from the preceding description, are efficiently attained and, since certain changes may be made in the above construction without departing from the scope of the invention, it will be intended that all matter contained in the above description or shown in the accompanying drawings be interpreted as illustrative and not in a limiting sense.

It is also to be understood that the following claims are intended to cover all of the generic and specific features of the invention herein described.

I claim:

1. Web supply apparatus comprising

A. a first source of web,

B. a second source of web,

C. an inaccessible splicing station through which web travels alternately from the first and second sources, said splicing station including 1 . a first pressure pad, 2. a second pressure pad, said pads being movable toward and away from one another, 3. means for moving the pressure pads toward and away from one another in response to a command, 4. a first knife assembly associated with the first pressure pad, said knife assembly including a first blade movable from a retracted position out of the path of web from the first source through the splicing station to an extended position wherein it projects through the path of web from the first source through the splicing station, 5. a second knife assembly associated with the second pressure pad, said second knife assembly including a second blade movable from a retracted position out of the path of web from the second source through the splicing station to an extended position wherein it projects through the path of web from the second source through the splicing station, each said pressure pad extending above and below the corresponding knife assembly so that when the two pads come toward one another, they retain the web on both sides of the cutting knife blade, and 6. means for moving the two blades between their two positions, D. means for guiding web from one of the sources through the splicing station between the two pads, E. a loading station remote from the splicing station at a location accessible to an operator, F. means for moving the leading end of the web from the other source from the loading station to a position at the splicing station between the two pressure pads, G. control means for commanding the pressure pad moving means to move the pressure pads toward one another so that the web from the one source is pressed against the leading edge of the web from the other source so that the two become joined, and H. means for commanding the blade moving means which moves the blade adjacent the path of the web from the one source to move to its second position while the pads are moved toward one another so that said blade severs the web from the one source just behind its joint to the web from the other source.

2. The web supply apparatus defined in claim 1 and further including a knife backup positioned directly between the two knife assemblies against which the cutting knife blade acts when cutting the web from the one source, said knife backup also shielding the web from the other source from said cutting knife blade during the cutting operation.

3. Web supply apparatus as defined in claim 2 wherein the backup is comprised of a rail extending parallel to the knife blades, said rail having A. a first blade receiving slot directly opposite the first knife blade and a second blade receiving slot directly opposite the second knife blade, said first and second knife blades and their slots being offset relative to one another.

4. Web supply apparatus as defined in claim 1 and further including a web accumulator located downstream from the splicing station and further including means for stopping the one source of web so that a joint can be formed at zero web speed, the accumulator providing the web required by a downstream web-consuming machine while the incoming web is stopped.

5. The web supply apparatus defined in claim 1 wherein the means for moving the leading end of the web from the other source from its loading station to the splicing station is comprised of A. a bar to which said leading end is affixed, and B. means for removably locating the bar at the splicing station between the pressure pads.

6. The web supply apparatus defined in claim 5 wherein the locating means includes a pair of retainers at the splicing station for retaining the opposite ends of the bar between the pressure pads.

7. The web supply apparatus defined in claim 6 wherein the retainers are movable along with the associated pressure pads.

8. The web supply apparatus defined in claim 5 wherein

A. the first and second web sources are mounted on roll stands of the rollout type, and B. the bar locating means is comprised of means on each roll stand for supporting the bar to which the leading end of the web from the other source is affixed so that when the roll stand supporting the other source is moved to its normal position for feeding web, the positioning bar supported by that stand properly locates the leading edge of the web at the splicing station beween the pads.

9. The web supply apparatus defined in claim 5 wherein the bar locating means includes A. transport means connected to each web positioning bar, said transport means communicating between the web loading station and the splicing station, and B. means for driving the transport means so as to move the positioning bar between its two stations.

10. Web supply apparatus comprising

A. a first source of web,

B. a second source of web,

C. a splicing station not conveniently accessible to an operator, said splicing station including 1. first pressure applying means, 2. second pressure applying means, said pressure applying means being movable toward and away from one another, 3. a first knife assembly associated with the first pressure applying means, said first knife assembly including a first blade movable from a retracted position to an extended position wherein it projects beyond the first pressure applying means toward the second pressure applying means, 4. *a* second knife assembly associated with the second pressure applying means, said second knife assembly including a second blade movable from a retracted position to an extended position wherein it projects beyond the second pressure applying means toward the first pressure applying means, D. means for moving the leading end of the web from one of the sources from an [inaccessible] *accessible* loading station to a position at the splicing station between the two pressure applying means, said means for moving the leading [eand] *end* of the web from each source from its loading station to the splicing station being comprised of 1. a [movable] bar to which said leading end is affixed, and 2. means for removably locating the bar at the splicing station between the pressure applying means, E. means for moving the pressure applying means toward and away from one another to splice webs trained between them, and F. means for moving the first and second blades between their two positions.

11. The web supply apparatus defined in claim 10 wherein the locating means are comprised of retainers at the splicing station for supporting the bar between the pressure applying means.

12. The web supply apparatus defined in claim 10 wherein

A. the first and second web sources are mounted on roll stands of the roll-out type, and B. the bar locating means are comprised of means on each roll stand for supporting the bar to which the leading end of the web from a source is affixed so that when the roll stand supporting that web end is moved to its normal position for feeding the web, the positioning bar supported by that stand properly locates the leading end of that web at the splicing station between the pressure applying means.

13. The web supply apparatus defined in claim 10 wherein the bar locating means include A. transport means connected to each [web positioning] bar, said transport means communicating between each web loading station and the splicing station, and B. means for moving the transport means so as to carry each [positioning] bar between its two stations.

14. The web supply apparatus defined in claim 10 wherein the pressure applying means extend above and below the corresponding knife blade so that when the pressure applying means come together, they grip the web between them on both sides of the blade.

15. The web supply apparatus defined in claim 13 and further including means for controlling the transport means so as to locate each [positioning] bar at one of its two stations.

16. The web supply apparatus defined in claim 13 wherein the transport means are comprised of A. a chain loop extending between one said loading station and the splicing station, and B. means for driving the chain so that the [positioning] bar connected thereto is carried by the chain between the two stations.

17. The web supply apparatus defined in claim 11 wherein the bar includes a pair of flexible, resilient end extensions secured to the retainers to permit the bar to flex relative to the retainers.

18. The web supply apparatus defined in claim 13 and further including means for adjusting the path of the transport means to compensate for the change in said path which occurs when the pressure applying means are moved.

19. Web supply apparatus comprising

A. a first source of web,

B. a second source of web,

C. a splicing station through which web travels alternately from the first and second sources, said station including, 1. first pressure applying means, and 2. second pressure applying means, said pressure applying means being movable toward and away from one another, D. a first knife assembly, said first knife assembly including a first blade movable from a retracted position out of the path of the web from the first source through the splicing station to an extended position wherein it projects into the path of the web from the first source through the splicing station, E. a second knife assembly, said second knife assembly including a second blade movable from a retracted position wherein it is out of the path of the web from the second source through the splicing station to an extended position wherein it projects into the path of the web from the second source through the splicing station, said pressure applying means extending upstream and downstream relative to their corresponding knife blades so that when the pressure applying means are moved to their extended positions, they grip the web between them on both sides of the blades, F. means for moving the pressure applying means toward and away from one another to splice webs trained between them, G. means for moving the first and second blades between their two positions, and H. a web accumulator located downstream from the splicing station, said accumulator providing the web required by a downstream web-consuming machine while the incoming web is temporarily gripped by the pressure applying means.

*20. Web supply apparatus comprising*

*A. a web accumulator;*

*B. a splicing station located directly underneath the accumulator that is not readily accessible to an operator;*

*C. a pair of roll stands of the roll-out type for supporting a pair of web rolls one of which is expiring into the accumulator, the other of which is at the ready, each said stand being movable generally parallel to the axes of the rolls between said splicing station and a loading station adjacent the accumulator that is readily accessible to the operator,*

*D. positioning means supported on each roll stand for positioning the leading edge of the ready web when the roll stand supporting the ready web is located at its loading station;*

*E. means supporting the roll stand containing the ready web for movement to the splicing station so that the leading edge of the ready web is positioned directly opposite the expiring web, and*

*F. means permanently suspended from the overhead accumulator at the splicing station for pressing the expiring web and ready web together to splice them so that web can proceed continuously into the overhead accumulator.*

*21. The web supply apparatus defined in claim 20 and further including means permanently suspended from the overhead accumulator for severing the trailing end of the expiring web upstream from said splice.*

*22. The web supply apparatus defined in claim 20 wherein each positioning means comprises an elongated rigid bar extending the full width of the web proceeding into the accumulator.*

* * * * *